(12) United States Patent
Tajima et al.

(10) Patent No.: US 11,341,007 B2
(45) Date of Patent: May 24, 2022

(54) STORAGE SYSTEM AND STORAGE CONTROL METHOD

(71) Applicant: Hitachi, Ltd., Tokyo (JP)

(72) Inventors: Sachie Tajima, Tokyo (JP); Masakuni Agetsuma, Tokyo (JP); Shintaro Ito, Tokyo (JP); Takahiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/200,387

(22) Filed: Mar. 12, 2021

(65) Prior Publication Data

US 2022/0050757 A1 Feb. 17, 2022

(30) Foreign Application Priority Data

Aug. 17, 2020 (JP) .............................. JP2020-137460

(51) Int. Cl.
*G06F 11/00* (2006.01)
*G06F 11/20* (2006.01)

(52) U.S. Cl.
CPC ...... *G06F 11/2028* (2013.01); *G06F 11/2041* (2013.01); *G06F 11/2048* (2013.01); *G06F 11/2094* (2013.01); *G06F 2201/82* (2013.01)

(58) Field of Classification Search
CPC ............ G06F 11/2028; G06F 11/2041; G06F 11/2048; G06F 11/2094
See application file for complete search history.

(56) References Cited

U.S. PATENT DOCUMENTS

| 2019/0163593 A1* | 5/2019 | Agetsuma | G06F 11/1482 |
| 2020/0125258 A1* | 4/2020 | Chiba | G06F 3/0679 |
| 2020/0310697 A1* | 10/2020 | Subramanian | G06F 3/0661 |

FOREIGN PATENT DOCUMENTS

JP 2019101703 A 6/2019

* cited by examiner

*Primary Examiner* — Michael Maskulinski
(74) *Attorney, Agent, or Firm* — Procopio, Cory, Hargreaves & Savitch LLP

(57) ABSTRACT

Two or more nodes respectively provided with two or more storage control programs constituting each redundantization group maintain redundantization of metadata at the two or more nodes. When a node failure occurs, a failover from the corresponding active storage control program to a standby storage control program is performed. As regarding at least one standby storage control program, a node with the standby storage control program arranged therein compresses a target metadata portion including a metadata portion capable of being accessed after the failover, of metadata existing in the node as regarding the corresponding redundantization group, and stores the same in a memory of the node.

10 Claims, 12 Drawing Sheets

FIG. 5A

STORAGE DESTINATION CONTROL TABLE
453

| ID | STATE | START ADDRESS | END ADDRESS | TYPE | PRIORITY |
|---|---|---|---|---|---|
| 1 | ACTIVE | 000000 | 123456 | MONITOR | 4 |
| 1 | ACTIVE | 123457 | 234567 | START-UP | 6 |
| 1 | ACTIVE | 234568 | 345678 | CACHE | 1 |
| 2 | STANDBY | 000000 | 123456 | MONITOR | 5 |
| 2 | STANDBY | 123457 | 234567 | START-UP | 2 |
| 2 | STANDBY | 234568 | 345678 | CACHE | 3 |
| 3 | STANDBY | 000000 | 123456 | MONITOR | 5 |
| ... | ... | ... | ... | ... | ... |

CONDITION APPLICATION TABLE
454

| ADDRESS | APPLICATION OF CONDITION 1 | APPLICATION OF CONDITION 2 |
|---|---|---|
| 012345 | APPLICATION | APPLICATION |
| 212345 | NON-APPLICATION | NOT APPLICABLE |
| ... | ... | ... |

521, 522, 523

COMPARATIVE EXAMPLE ately arranged in two or more different storage nodes. As regarding the redundantization groups, configuration information necessary to read and write requested data from and in a storage device is made redundant to the two or more storage nodes.

STORAGE SYSTEM AND STORAGE CONTROL METHOD

BACKGROUND

The present invention relates generally to storage control of a storage system constituted of a plurality of storage nodes.

As this type of storage system, there has been known a storage system disclosed in, for example, Japanese Unexamined Patent Application Publication No. 2019-101703. This discloses, for example, the following. That is, two or more storage control programs which constitute redundantization groups each having an active-standby (passive) configuration are respectively arranged in two or more different storage nodes. As regarding the redundantization groups, configuration information necessary to read and write requested data from and in a storage device is made redundant to the two or more storage nodes.

SUMMARY

Prescribed software may be executed in each of a plurality of storage nodes to realize one (or plural) SDSs (Software Defined Storage) based on the storage nodes. One or a plurality of redundantization groups may be arranged in the storage nodes based on the SDSs. When a failure occurs in the storage node with an active storage control program arranged therein as regarding each redundantization group, a failover from the active storage control program to any standby storage control program is performed. The configuration information disclosed in Japanese Unexamined Patent Application Publication No. 2019-101703 is an example of metadata.

It is desired that SDS meets the following (A) to (C):
(A) to reduce consumption (consumption storage capacity) of a memory,
(B) to continue I/O even if a storage node failure occurs, and
(C) to reduce an increase (deterioration) in I/O latency after the failover.

As regarding the redundantization group, (B) can be implemented as long as metadata is made redundant to two or more storage nodes.

However, when metadata used by a storage control program as a failover destination is stored in a storage device, I/O (specifically, the reading of metadata from the storage device to the memory) for the storage device is required each time access to the metadata is performed after the failover, thereby increasing the I/O latency after the failover. That is, it is not possible to meet (A).

Meanwhile, when the metadata used by the storage control program as the failover destination is stored in the memory, memory consumption is increased by the data amount of the metadata. That is, it is not possible to meet (C).

The above-described problems can also occur in other types of storage systems capable of failover between the storage nodes.

As regarding each redundantization group, two or more storage nodes respectively provided with two or more storage control programs constituting the corresponding redundantization group maintain redundantization at the two or more storage nodes, of metadata accessed in storage control. As regarding each active storage control program, a processor of a storage node with the active storage control program arranged therein stores in a memory of the storage node by uncompression, an active metadata portion being a portion used in at least the active storage control program, of metadata existing in the storage node as regarding the corresponding redundantization group, and performs I/O by using an uncompressed active metadata portion being in the memory. When a failure occurs in the storage node with the active storage control program arranged therein, a failover in the same redundantization group from the active storage control program to a standby storage control program is performed. As regarding at least one standby storage control program, a storage node with the standby storage control program arranged therein compresses a target metadata portion including a metadata portion capable of being accessed after the failover, of metadata existing in the storage node as regarding the corresponding redundantization group, and stores the same in the memory of the storage node.

According to the present invention, ever, if a storage node failure occurs, it is possible to reduce memory consumption and reduce an increase in I/O latency after a failover in addition to continuing I/O.

BRIEF DESCRIPTION OF THE DRAWINGS

FIG. 5A shows a configuration example of a storage destination control table;
FIG. 6 shows an example of the flow of condition 1 reflection processing.

DETAILED DESCRIPTION

Figure 1:
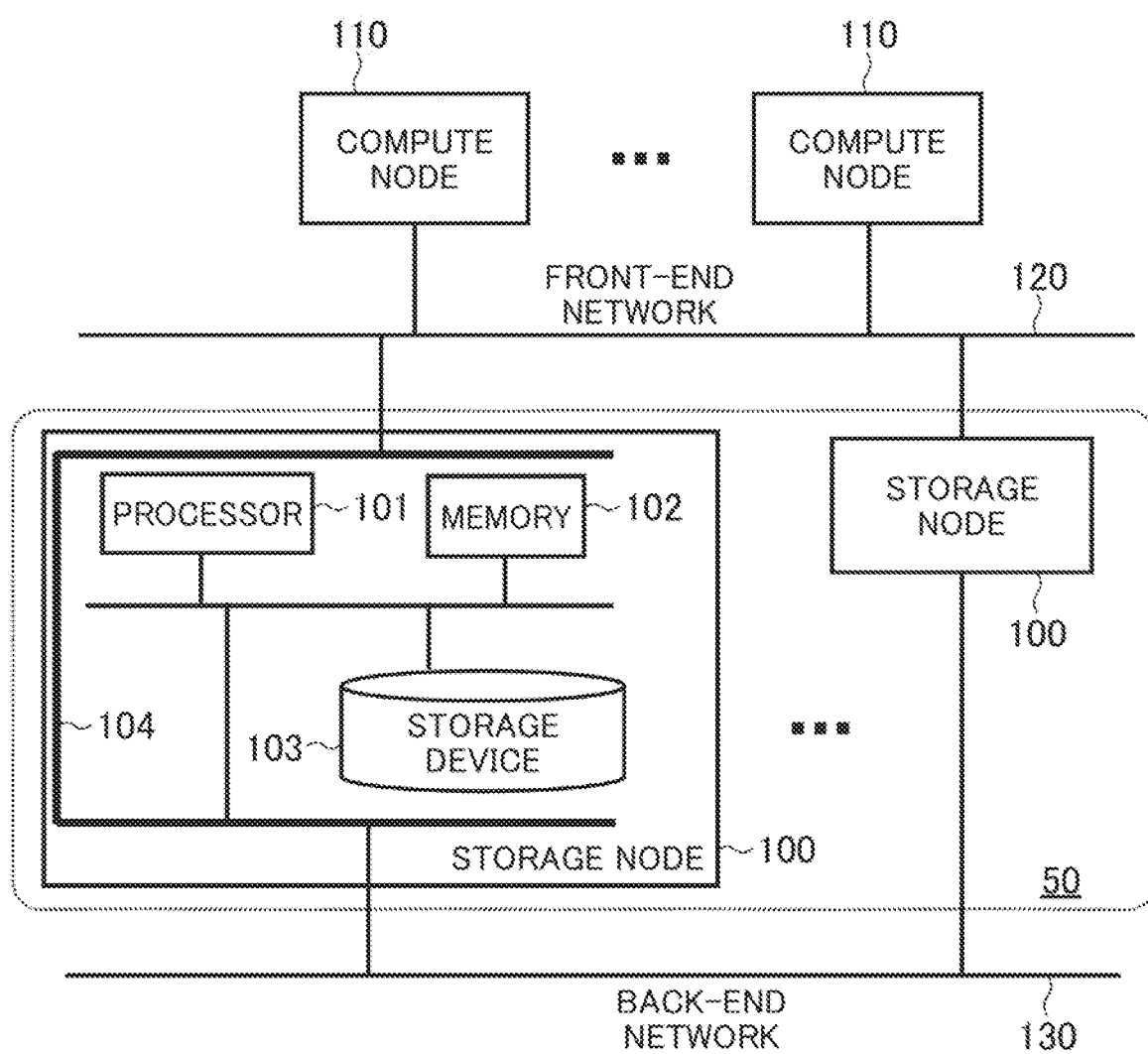
FIG. 1 shows a configuration example of an entire system according to one embodiment.

In the following description, the term "interface device" may be one or more interface devices. The one or more interface devices may be at least one of the following:
one or more I/O (Input/Output) interface devices. The I/O (Input/Output) interface device is an interface device to at least one of an I/O device and a remote display computer. The I/O interface device to the display computer may be a communication interface device. At least one I/O device may be either of a user interface device, e.g., input devices like a keyboard and a pointing device, and an output device like a display device, and one or more communication interface devices. The one or more communication interface devices may be one or more similar communication interface devices (e.g., one or more NIC (Network Interface Card)) or may be two or more dissimilar communication interface devices (e.g., NIC and HBA (Host Bus Adapter)).

Also, in the following description, the term "memory" may be one or more memory devices, typically, a main storage device. At least one memory device in the memory may be a volatile memory device or may be a non-volatile memory device.

Further, in the following description, the term "storage device" may be one or more persistent storage devices. The persistent; storage device may be typically a non-volatile storage device (e.g., an auxiliary storage device), specifically, for example, an HDD (Hard Disk. Drive), an SSD (Solid State Drive), a NVME (Non-Volatile Memory Express) drive, or an SCM (Storage Class Memory).

Furthermore, in the following description, the term "processor" may be one or more processor devices. The at least one processor device may be typically a microprocessor device like a CPU (Central Processing Unit), but may be another kind of processor device like a GPU (Graphics Processing Unit). The at least one processor device may be a single core or a multicore. The at least one processor device may be a processor core. The at least one processor device may be a broad processor device such as a circuit (e.g., an FPGA (Field-Programmable Gate Array), a CPLD (Complex Programmable Logic Device) or an ASIC (Application Specific Integrated Circuit) being an aggregate of gate arrays by a hardware description language which performs a part or all of processing.

Additionally, in the following description, there is a case where information that the output is obtained for the input is described in terms of "xxx table". However, the information may be data of any structure (e.g., it may be structured data or non-structured data) or may be a learning model typified by a neural network, a genetic algorithm or a random forest which generates an output for an input. It is thus can be said that the "xxx table" is "xxx information". Also, in the following description, the configuration of each table is an example. One table may be divided into two or more tables, or all or part of the two or more tables may be one table.

Additionally, in the following description, the processing may be described with "program" as a subject. However, the program is performed by a processor so that predetermined processing is appropriately carried out while using a storage device and/or an interface device or the like, and thus the subject of the processing may be defined as a processor (or a device like a controller having the processor). The program may be installed in an apparatus like a computer from a program source. The program source may be, for example, a (for example, non-temporary) storage medium readable by a program distribution server or a computer. Further, in the following description, two or more programs may be realized as one program or one program may be realized as two or more programs.

Further, in the following description, when the same types of elements are described without separation, a common number among the reference symbols is used, whereas when the same type of elements are described separately, reference numbers are used in some cases.

Figure 12:
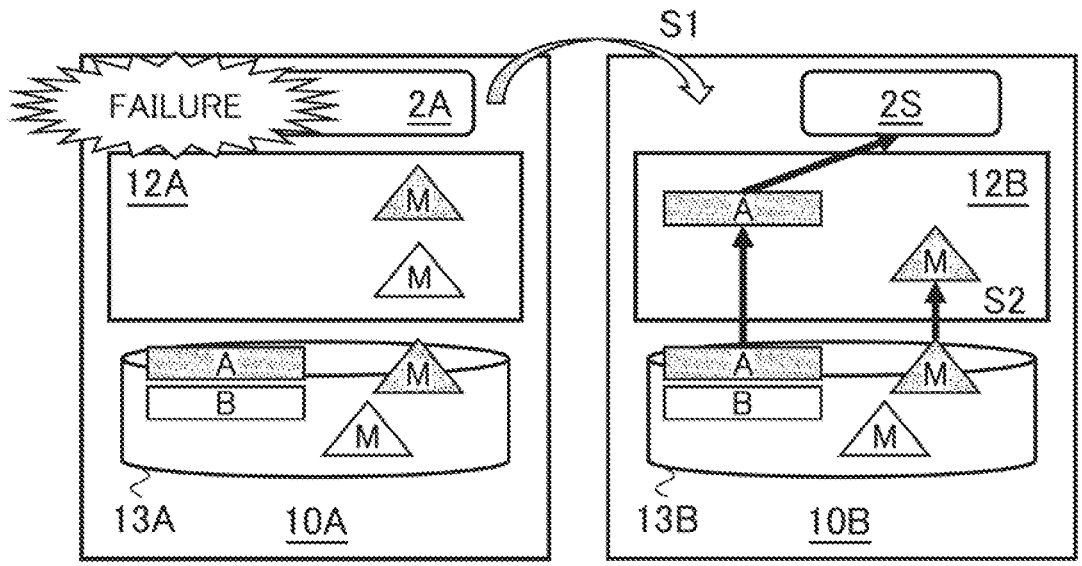
FIG. 12 shows an example of an outline of a comparative example.
Figure 13:
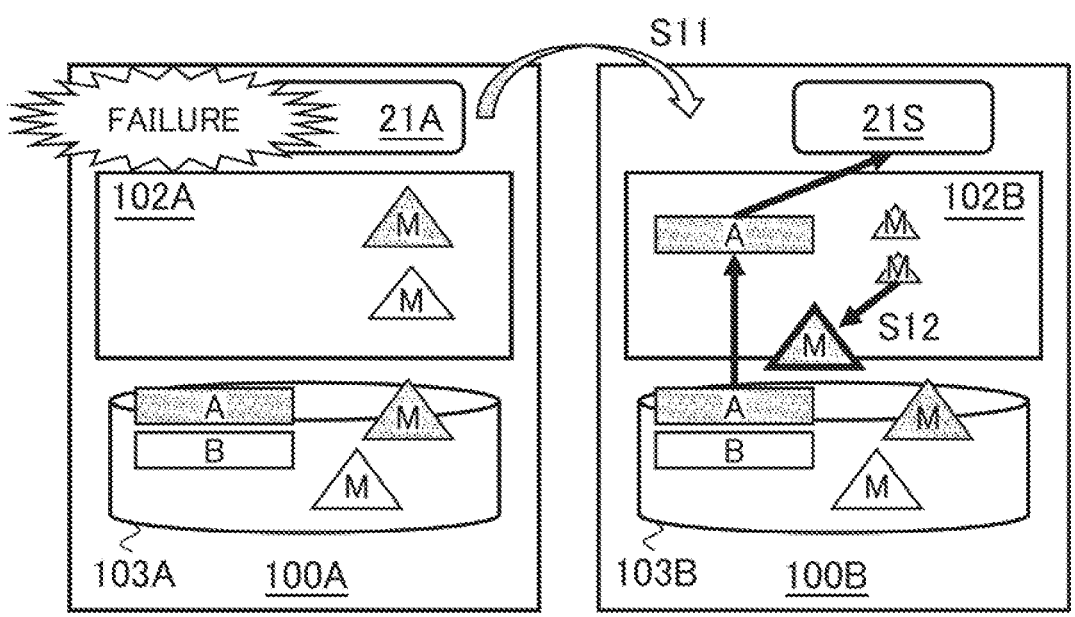
FIG. 13 shows an example of an outline of an embodiment.

FIG. 12 shows an example of an outline of a comparative example. FIG. 13 shows an example of an outline of an embodiment.

In FIGS. 12 and 13, a square with a character "A" or "B" attached thereto means user data. A triangle with a character "M" attached thereto means a metadata portion. User data expressed in grey is associated with a metadata portion expressed in the same grey. User data expressed in white is associated with a metadata portion expressed in the same white. The "user data" is data input/output in response to an I/O request.

As illustrated by FIG. 12, according to the comparative example, for a certain redundantization group, an active storage control program 2A is arranged in a storage node 10A, and a standby storage control program 2S is arranged in a storage node 10B. Both of the user data A and B are respectively stored in a storage device 13A of the storage node 10A and a storage device 13B of the storage node 10B. The metadata portions of the user data A and B are also respectively stored in the storage devices 13A and 13B. However, neither metadata portions of the user data A and B are stored in a memory 125 of the storage node 10B.

When a failure occurs in the storage node 10A, a failover from the active storage control program 2A to the standby storage control program 2S is performed (S1), so that the standby storage control program 2S becomes an active storage control program. Thereafter, when the active storage control program receives a read request of the user data A, it is necessary for the active storage control program to read the metadata portion of the user data A from the storage device 13B to the memory 12B for the purpose of accessing the metadata portion of the user data A in order to read the user data A (S2). Therefore, I/O latency is increased after the failover.

It is considered that in order to avoid the increase in the I/O latency, the respective metadata portions of the user data A and B are read into the memory 12B in advance before the failure occurs in the storage node 10A. Doing so however will increase consumption of the memory 12B.

Thus, as illustrated by FIG. 13, according to the present embodiment, the metadata portion of each of the user data A and B is compressed and then stored in a memory 102B as an example of the metadata portion capable of being accessed after the failover in a storage node 100B with a standby storage control program 21S arranged therein. Therefore, when the storage control program as a failover destination receives a read request of the user data k after a failover (S11) within the same redundantization group from an active storage control program 21A to the standby storage control program 21S, the compressed metadata portion of the user data A may be decompressed (S12). That is, it is not necessary to read the metadata portion of the user data A from, a storage device 103B to the memory 102B. It is therefore possible to reduce an increase in I/O latency after the failover. Further, since the metadata portion of the user data A is compressed and then stored in the memory 102B, the consumption of the memory 12B can also be reduced.

The present embodiment will hereinafter be described in detail.

FIG. 1 shows a configuration example of the whole system according to the present embodiment.

The system includes a plural (or one) compute node 110 and a storage system 50. The storage system 50 includes a plurality of storage nodes 100. The storage nodes 100 respectively execute predetermine software, so that the storage system 50 may function as one (or plural) SDSs (Software Defined Storages) (or SDDCs (Software Defined Data Centers)). The storage system 50 may be scale-adjusted depending on an increase/decrease in the storage node 100. The storage system 50 may be a distributed system.

The computer nodes 110 and the storage nodes 100 are respectively connected to a front-end network 120. Further, the storage nodes 100 are connected ever, to a back-end network 130. Communication between the compute node 110 and the storage node 100 is performed via the front-end network 120. Communication between the storage nodes 100 is performed via the back-end network 130. Each of the front-end network 120 and the back-end network 130 nay be a fibre channel (Fibre Channel), an Ethernet (Registered Trademark), an InfiniBand or a wireless LAN (Local Area Network) or the like. Each of the front-end network 120 and the back-end network 130 is an example of a communication network. The compute nodes 110 and the storage nodes 100 may be connected to one communication network as a substitute for the front-end network 120 and the back-end network 130.

The compute node 110 is a computer which functions as a host (host device) with respect to the storage node 100. At least one compute node 110 may be a virtual machine or a virtual computer like a container. The compute node 110 receives an instruction from an unillustrated client and issues an I/O request to the storage node 100 through the front-end network 120. Incidentally, in place of the compute node 110, the function of the compute node 110 may be provided in the storage node 100. That is, a so-called hyper converged infrastructure may be adopted in which the storage node 100 performs both of the issuance of an I/O request and storage control. Further, the compute node 110 and the storage node 100 may be respectively installed together on a bare metal as processes (in this case, the bare metal functions as a storage node (and a compute node)).

The storage node 100 is a computer (e.g., a server device) which provides a storage domain (e.g., a logical volume) to the compute node 110. The storage node 100 may be a virtual machine. The storage node 100 may be a general-purpose computer or may be an exclusive computer (e.g., a so-called disk array device having a plurality of persistent storage devices).

The storage node 100 includes an interface device 104, a storage device 103, a memory 102, and a processor 101 connected to them. The interface device 104 is connected to the front-end network 120 and the back-end network 130. The storage device 103 becomes a basis of the storage domain provided to the compute node 110.

Figure 2:
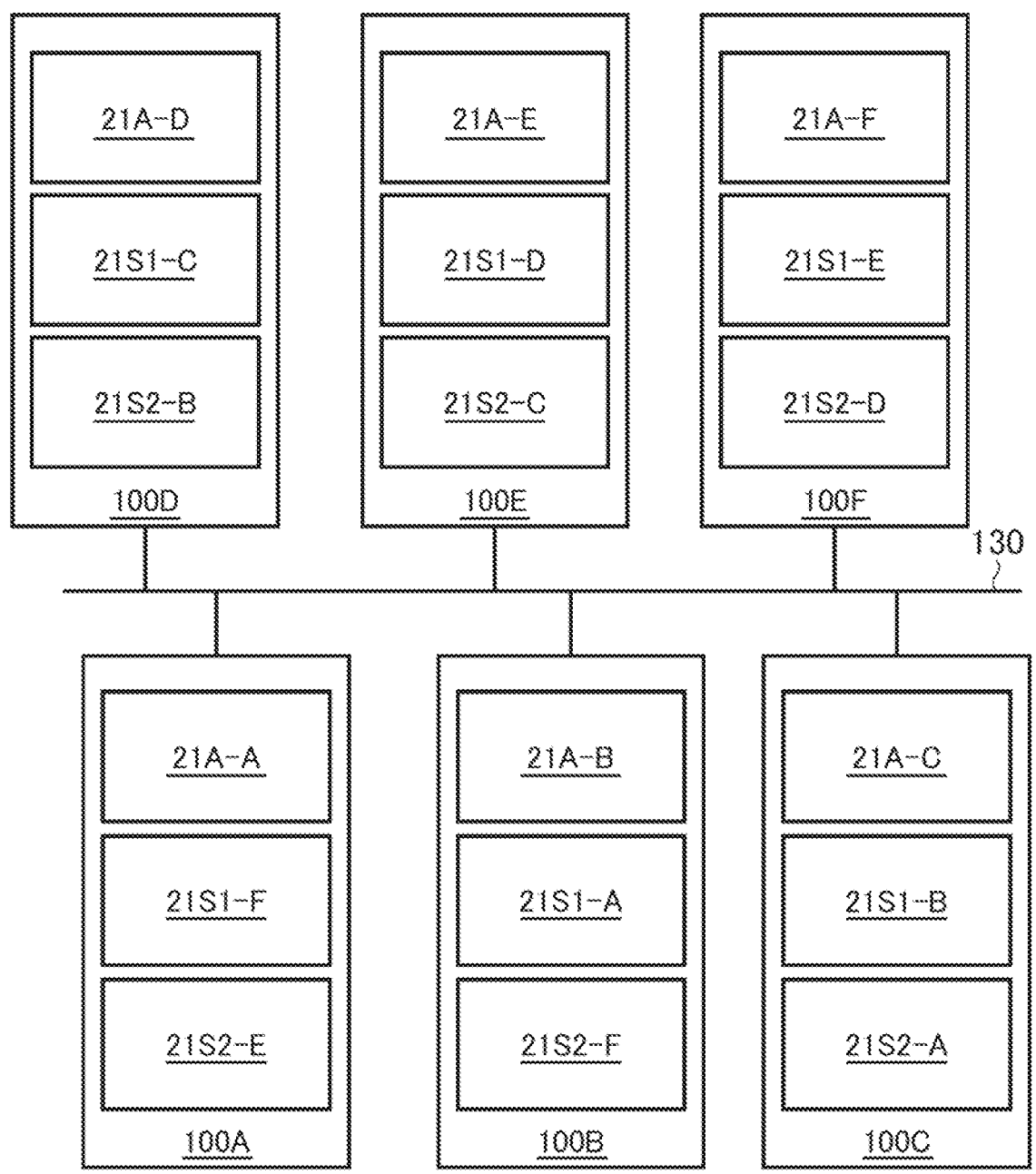
FIG. 2 shows a configuration example of a storage system before a failover.

FIG. 2 shows a configuration example of the storage system 50 before a failover.

According to the example shown by FIG. 2, there are six storage nodes 100A to 100F. Six redundantization groups A to F are arranged in the storage nodes 100A to 100F. Each redundantization group is constituted of an active storage control program 21A, and two standby storage control programs 21S1 and 21S2 (example of one or two or more standby storage control programs). Branch codes of reference codes in each storage control program are identifiers (any of A to F) of each of the redundantization groups.

According to the example shown by FIG. 2, the arrangement of the redundantization groups is as defined in the following rules. That is, a plurality of active storage, control programs 21A and a plurality of standby storage control programs 21S are also equally arranged in the storage nodes 100A to 100F:

three storage control programs 21A, 21S1, and 21S2 constituting each redundantization group are respectively arranged in three different storage nodes 100, and
at least one active storage control program 21A is arranged in each storage node 100.

Incidentally, all the redundantization groups need not to be the same in configuration (specifically, the number of standby storage control programs). The number of the standby storage control programs 21S is defined as N where resistance to an N-multiple failure is desired (N: natural number) with respect to each redundantization group.

Further, a storage node 100 may exist in which no active storage control program 21A is arranged. A storage node 100 may exist in which no standby storage control program 21S is arranged.

Figure 3:
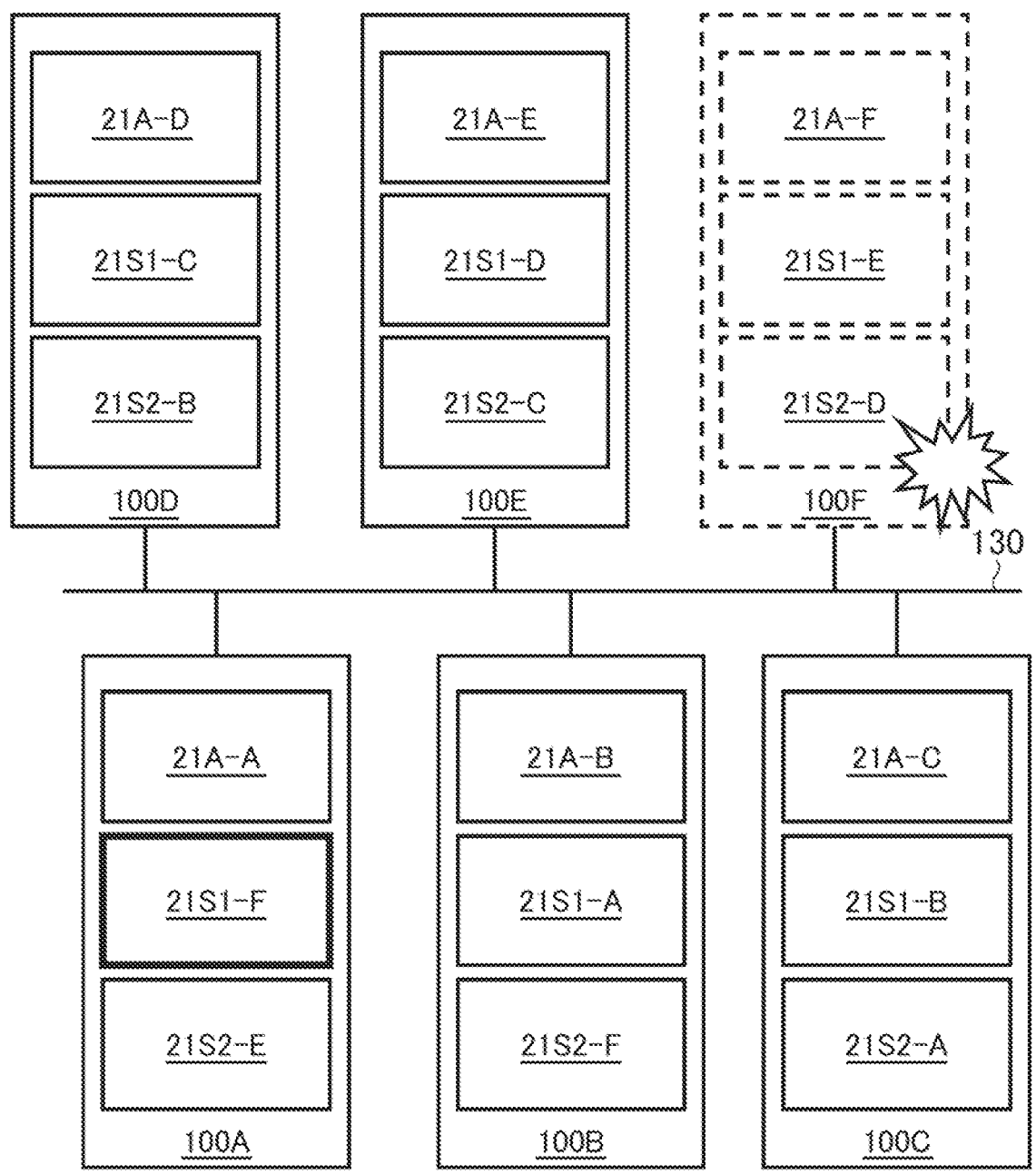
FIG. 3 shows a configuration example of the storage system after the failover.

FIG. 3 shows a configuration example of the storage system 50 after the failover.

Assume that a failure has occurred in the storage node 100F. The active storage control program 21A arranged in the storage node 100c is only the storage control program 21A-F which belongs to the redundantization group F. Therefore, the failover is performed on the redundantization group F. A failover destination may be either of the standby storage control programs 21S1-F and 21S2-F. According to the example shown by FIG. 3, the failover destination is the standby storage control program 21S1-F in the storage node 100A. The active storage control program 21A-F stops, and the state of the standby storage control program 21S1-F is upgraded to "active".

Incidentally, all the standby storage control programs 21S may be operated for at least one redundantization group (however, no reception of I/O request is done). The standby storage control programs 21S other than the standby storage control program 21S as the failover destination may be stopped. In the storage node 100F with the failure generated therein, the standby storage control programs 21S1-E and 21S2-D stop, but the standby storage control programs 21S2-E and 21S1-D respectively belonging to the same redundantization group may be operated.

In the storage system 50, user data is made redundant to the two or more storage nodes 100. Thus, even when a failure occurs in any storage node 100, the user data can be read from another storage node 100. As the redundantization of the user data, redundantization such as Erasure Coding, RAIN (Redundant Array of Independent Nodes), and node-to-node mirroring may be adopted. Two or more data sets based on the redundantization of the user data may foe stored in the storage devices 103 of the two or more storage nodes 100. The "data sets" may be a cluster of electronic data as viewed from the program like the storage control program 21, specifically, e.g., user data itself or parity.

Further, in the storage system 50, metadata is also made redundant to the two or more storage nodes 100. Specifically, for example, for each redundantization group, metadata is stored in two or more storage nodes 100 in which two or more storage control programs 21 constituting each redundantization group are arranged. The metadata may include metadata portions different in every redundantization group or may include a metadata portion common to all the redundantization groups. The metadata may include, for example, data (configuration information disclosed in Patent Document 1, for example) indicating respective positions (for example, a set of a logical volume ID and an address (e.g., an LBA (Logical Block Address)) of a plurality of data sets based on the redundantization of user data for each user data. The metadata made redundant is updated synchronously for each redundantization group. For example, when a metadata portion accessed by a certain storage control program 21 is updated, the updating of the metadata portion is reflected to metadata portions of the respective remaining storage control programs in the redundantization group to which the certain storage control program 21 belongs. Incidentally, in the present embodiment, the "metadata" may be at least part of data other than the user data, e.g., data classified into a predetermined type of data of one or plural types of data other than the user data.

Figure 4:
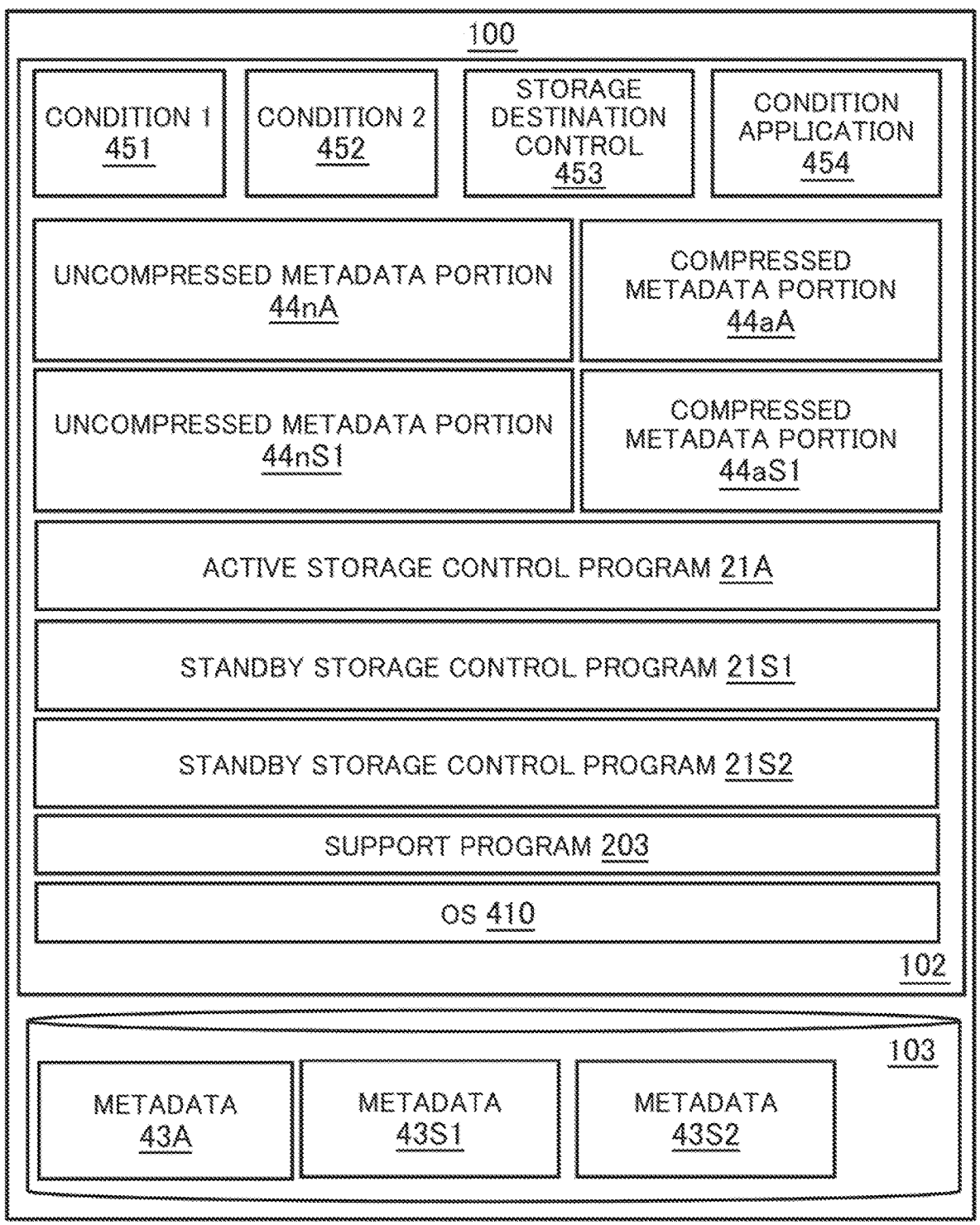
FIG. 4 shows an example of programs and data stored in a storage node.

FIG. 4 shows an example of programs and data stored in the storage node 100.

Metadata 43 is stored in the storage device 103 of the storage node 100. In the present embodiment, for example, one active storage control program 21A and two standby storage control programs 21S1 and 21S2 exist in the storage node 100. Therefore, as the metadata 43, there are provided metadata 43A accessed by the active storage control program 21A and metadata 43S1 and 43S2 respectively accessed by the standby storage control programs 21S1 and 21S2. At least part of the metadata 43 may be compressed and then stored in the storage device 103.

As programs stored in the memory 102 of the storage node and executed by the processor 101, there are an OS (Operating System) 410 and a support program 203 in addition to the above-described storage control programs 21A, 21S1, and 21S2 which respectively perform storage control. The storage control may include I/O of the user data complying with the I/O request, and further may include other types of storage control like data copying between logical volumes. The support program 203 may perform redundantization and synchronization of the metadata 43. Specifically, it may include at least one of the redundantization unit 22 and the cluster control unit 23 disclosed in Patent Document 1, for example. The function of the support program 203 may be included in the storage control program 21.

As the data stored in the memory 102 of the storage node, there is metadata 43 read from the storage device 103. The metadata 43 stored in the memory 102 may be at least one of a compressed metadata portion 44a (metadata portion which is compressed), and an uncompressed metadata portion 44n (metadata portion which is not compressed). The uncompressed metadata portion 44n is a portion other than the compressed metadata portion 44a of the metadata 43. Further, in the present, embodiment, the "metadata portion" may be at least part of the metadata 43. According to the example shown by FIG. 4, specifically, it is as follows.

As to the metadata 43A corresponding to the active storage control program 21A, there is at least one of an uncompressed metadata portion 44nA and a compressed metadata portion 44aA. For details, for example, at least one of the following may be adopted:

the following may be adopted for each redundantization group. That is, the compressed metadata portion 44aA may be a portion at which the frequency of access by the active storage control program 21A is less than a threshold value. Specifically, for example, the active storage control program 21A (or support program 203) may compress the portion at which the frequency of access is less than the threshold value, of the metadata 43A existing in the storage node 100 for the redundantization group and store it in the memory 102. Consequently, it can be expected that a load increase due to decompression can also be reduced while achieving a reduction in memory consumption and a reduction of an increase in I/O latency after the failover. Incidentally, the "threshold value" described here may be a predetermined threshold value or a threshold value decided on the basis of the statistics of multiple access frequencies (e.g., the relative relation of access frequency) respectively corresponding to a plurality of metadata portions constituting metadata.

The following may be adopted for each redundantization group. That is, the compressed metadata portion 44aA may be a portion unnecessary for I/O which complies with an I/O request even if the frequency of access is more than or equal to the above-described threshold value. Specifically, for example, the active storage control program 21A (or support program 203) may compress the portion unnecessary for I/O complying with the I/O request even if the frequency of access is more than or equal to the above-described threshold value, of the metadata 43A existing in the storage node 100 for the redundantization group and store it in the memory 102. Consequently, a further reduction in memory consumption can be expected while achieving a reduction of an increase in I/O latency after the failover, and the following may be adopted for each redundantization group. That is, the compressed metadata portion 44aA may be a metadata portion necessary for start-up processing of the active storage control program 21A. Specifically, for example, the active storage control program 21A (or support program 203) may compress the metadata portion necessary for start-up processing of the active storage control program 21A, of the metadata 43A existing in the storage node 100 for the redundantization group and store it in the memory 102. The storage control program 21A whose state is upgraded from "standby" to "active" after the failover is started up based on the metadata portion necessary for start-up processing, hut is low in possibility to refer to the metadata portion after the start-up processing. Since such a metadata portion is compressed, a further reduction in memory consumption can be expected while achieving a reduction of an increase in I/O latency after the failover.

As to the standby storage control program 21S1, there is at least one of an uncompressed metadata portion 44nS1 and a compressed metadata portion 44aS1. The following may be adopted for each redundantization group. That is, the compressed metadata portion 44aS1 may be a metadata portion including a metadata portion which can be accessed after the failover. Specifically, for example, the processor 101 (e.g., the storage control program 21S1 or the support program 203) of the storage node 100 in which the standby storage control program 21S1 is arranged may compress a target metadata portion including a metadata portion capable of being accessed after the failover, of the metadata 43S1 existing in the storage node 100 for the redundantization group and store it in the memory 102. Consequently, even if a storage node failure occurs, it is possible to reduce memory consumption and reduce an increase in I/O latency after the failover in addition to continuing I/O.

Incidentally, as to at least one redundantization group, the standby storage control program 21S1 may be the standby storage control program 21S decided as a failover destination of the standby storage control programs 21S1 and 21S2. Thus, certainty of reducing an increase in I/O latency after the failover while reducing the memory consumption is enhanced. In this case, as shown by FIG. 4, the processor 101 (e.g., the storage control program 21S1 or the support program 203) of the storage node 100 with the standby storage control program 21S2 arranged therein needs not to store at least part of the metadata 43S2 in the memory 102. Consequently, a further reduction in memory consumption can be expected.

Further, when a metadata portion to be accessed by the storage control program 21 is not stored in the memory 102 and stored in the storage device 103, the storage control program 21 (or the support program 203) reads the metadata portion from the storage device 103 to the memory 102. In addition, when the metadata portion to be accessed by the storage control program 21 is stored in the memory 102 but compressed, the storage control program 21 (or the support program 203) decompresses the compressed metadata portion in the memory 102. Therefore, the compressed metadata portion is appropriately decompressed on so-called demand after the failover.

For each redundantization group, the compressed metadata portion 44a in the memory 102 may include portions excluding the following (X) and (Y), of the metadata. This is because when the following (X) and (Y) are in the memory 102 but are compressed, there is concern of speed reductions in start-up and I/O continuation after active upgrading due to the failover.

(X) A portion to be accessed for processing of making the standby storage control program 21S active due to the failover and starting it up, and (Y) A portion to be accessed for I/O which is performed when it is started up due to the failover.

Now, as the data stored in the memory 102 of the storage node, there are further condition 1 data 451, condition 2 data 452, a storage destination control table 453, and a condition application table 454. At least part of these may belong to the metadata.

The condition 1 data 451 is data indicative of a condition 1. The condition 1 is a condition under which memory storage is adopted (a storage destination is a memory). Specifically, for example, it may include a priority threshold value. In the present embodiment, a metadata portion (i.e., a metadata portion given priority as high as the condition 1 is met) corresponding to priority not greater than the priority threshold value (condition 1) is stored in the memory 102. In other words, when the condition 1 is not met, i.e., a metadata portion (i.e., a metadata portion given priority as low as the condition 1 is not met) corresponding to priority larger than the priority threshold value is stored in the storage device 103.

The condition 2 data 452 is data indictive of a condition 2. The condition 2 is a condition under which non-compression is adopted. Specifically, for example, it may include a priority threshold value. In the present embodiment, a metadata portion (i.e., a metadata portion given priority as high as the priority meets the condition 2) corresponding to priority not greater than the priority threshold value (condition 2) is uncompressed in the memory 102. A metadata portion high in priority as it is stored in the memory 102 but not high in priority as it is kept uncompressed is compressed in the memory 102.

According to the combination of the condition 1 and the condition 2, as a storage method of metadata, there are a plurality of storage methods which comply with at least one of whether memory storage is adopted and whether compression is adopted. The priority threshold value as the condition 1 and the priority threshold value as the condition 2 may be the same, but the priority threshold value as the condition 2 is preferably smaller than the priority threshold value as the condition 1. Thus, it is possible to discriminate whether the metadata portion stored in the memory 102 is uncompressed or compressed.

The storage destination control table 453 is a table used for control of the storage destination of the metadata portion.

The condition application table 454 is a table (in other words, a table indicative of an adopted storage method) indicating the situation of application of each of the conditions 1 and 2.

FIG. 5A shows a configuration example of the storage destination control table 453.

The storage destination control table 453 has a record for each metadata portion. Each record holds information such as an ID 501, a state 502, a start address 503, an end address 504, a type 505, and a priority 506. One metadata portion will be taken as an example ("attentional metadata portion" in the description of FIG. 5A).

The ID 501 indicates an ID of a storage control program 21 which accesses the attentional metadata portion. The state 502 indicates the state (active or standby) of the storage control program 21.

The start address 503 indicates a start address (an address at the storage device 103) of the attentional metadata portion. The end address 504 indicates an end address (an address at the storage device 103) of the attentional metadata portion. A read source (a range in the storage device 103) of the attentional metadata portion is understood from the combination of the start address 303 and the end address 504. Incidentally, when the attentional metadata portion is read into the memory 102, where the attentional metadata portion resides in the memory 102 may be managed by a table (not shown) included in the metadata or may be managed in the storage destination control table 453.

The type 505 indicates the type of the attentional metadata portion. That is, the metadata 43 may include one or plural types of metadata. The various metadata may be one metadata portion in the metadata 43. According to the present embodiment, as the type of metadata, there are "monitor", "start-up", and "cache". Monitor data being metadata which belongs to the type "monitor" is a metadata portion accessed for regular monitoring. Start-up data being metadata which belongs to the type "start-up" is a metadata portion accessed for start-up processing. Cache data being metadata which belongs to the type "cache" is a metadata portion (e.g., a metadata portion indicating in which area in the memory 102 data intended for I/O is cached) accessed for I/O which complies with an I/O request. Incidentally, at least the type 505 may be absent in the records.

The priority 506 indicates the priority (e.g., a priority level) of the attentional metadata portion. In the present embodiment, the priority is high as the value as the priority becomes smaller. According to FIG. 5A, even in the case of the same type of metadata, the priority differs depending on the state of the storage control program 21 which accesses the metadata. For example, according to FIG. 5A, the following standards are adopted:

a priority "1" is applied to cache data corresponding to the active storage control program 21A. This is to reduce an increase in I/O latency,
  a priority "2" is applied to start-up data corresponding to the standby storage control program 21S. This is because quick start-up with a failover is desirable,
  a priority "3" is applied to cache data corresponding to the standby storage control program 21S. This is to reduce an increase in I/O latency in I/O continuation after the failover,
  a priority "4" is applied to monitor data corresponding to the active storage control program 21A. The monitor data is accessed on a regular basis. This is however because it is low in importance as compared with the above types of metadata given any of the priorities "1" to "3",
  a priority "5" is applied to monitor data corresponding to the standby storage control program 21S. The importance of the monitor data is as described above. This is however because as compared with the monitor data accessed by the active storage control program 21A, the importance of the monitor data accessed by the standby storage control program 21S may be even lower, and a priority "6" is applied to start-up data corresponding to the active storage control program 21A. This is because after the state of the standby storage control program 21S is upgraded to "active" due to the failover, the start-up data is low in possibility of being accessed.

According to the standards, for example, "4" may be adopted for the priority threshold value (the priority threshold value at which the memory storage is adopted) as the condition 1, and "3" may be adopted for the priority threshold value (the priority threshold value at which the uncompression is adopted) as the condition 2. In this case, the metadata type of metadata given priority not greater than the priority "4" is stored in the memory 102, and the metadata type of metadata given priority not greater than the priority "3" is uncompressed That is, the metadata type of metadata given priority "4" is compressed and then stored in the memory 102.

FIG. 5B shows a configuration example of the condition application table 454.

The condition application table 454 has a record for each metadata portion. Each record holds information such as an address 521, a condition 1 application 522, and a condition 2 application 523. One metadata portion will be taken as an example ("attentional metadata portion" in the description of FIG. 5B).

The address 521 indicates an address (an address at the storage device 103) of an attentional metadata portion. The address 521 is a value which belongs to a range represented by each of the start address 503 and the end address 504 corresponding to the attentional metadata portion. By referring to the storage destination control table 453 with the address 523 as a key, a metadata portion corresponding to the address 521 can be specified.

The condition 1 application 522 indicates whether the condition 1 is applied to the attentional metadata portion. The condition 2 application 523 indicates whether the condition 2 is applied to the attentional metadata portion. There are "application", "non-application", and "nom-applicable" for each of the condition 1 and the condition 2. Incidentally, in the present embodiment, the "not-applicabie" is present because there is sequence (dependence) on the condition 1 and the condition 2. The "non-applicabie" needs not be adopted in the case where there is no sequence on the conditions 1 and 2. Examples of the combinations of the conditions 1 and 2 are as follows:

when the condition 1 is "application", and the condition 2 is "application, the attentional metadata portion is compressed and stored in the memory. That is, the attentional metadata portion depends on the memory as the compressed metadata portion, when the condition 1 is "application, and the condition 2 is "non-application", the attentional metadata portion is stored in the memory but is not compressed. That is, the attentional metadata portion exists on the memory as the uncompressed metadata portion, and the condition 2 becomes "non-applicable" when the condition 1 is "non-application". That is, in the present embodiment, the uncompressed attentional metadata portion exists in the storage device 103 in the case where the attentional metadata portion is not stored in the memory.

A description will hereinafter be made about examples of processing executed in the present embodiment.

Figure 6:
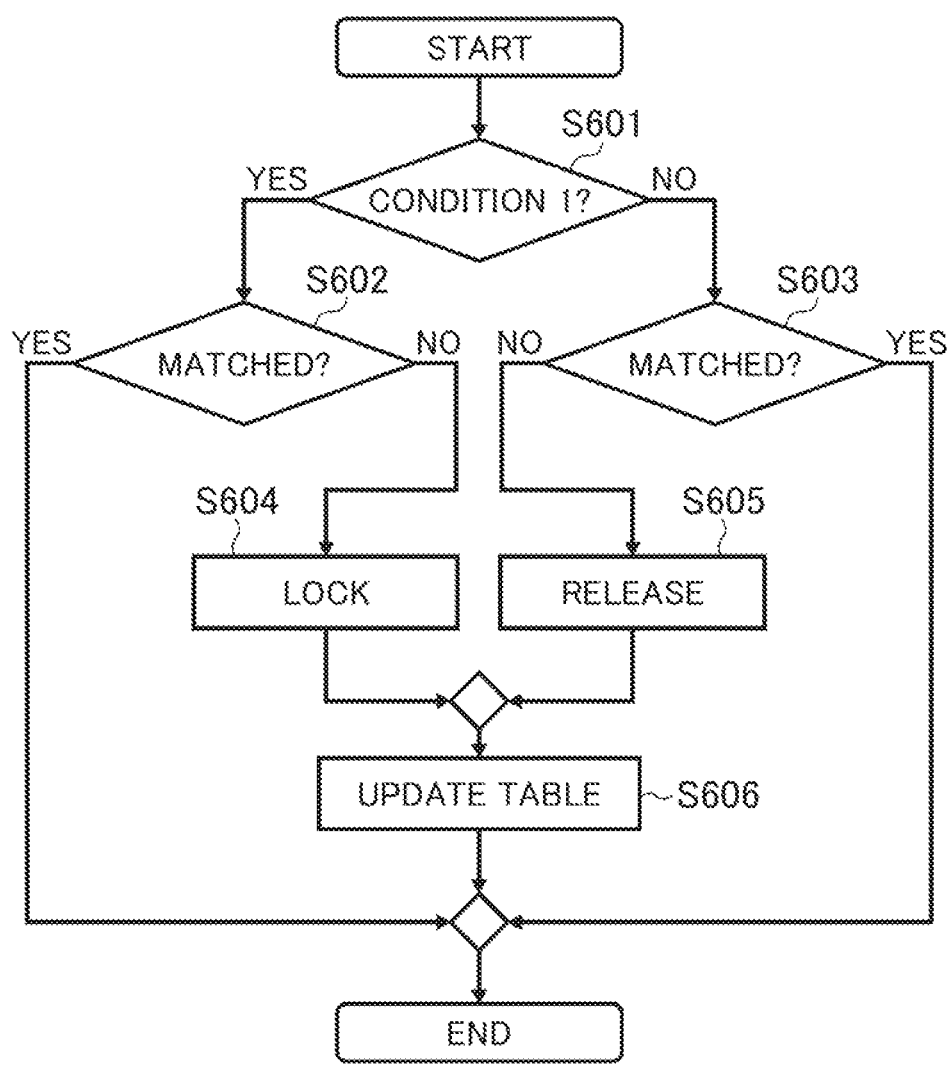
FIG. 6 shows a configuration example of a condition application table.

FIG. 6 shows an example of the flow of condition 1 reflection processing.

The condition 1 reflection processing is performed in the case of at least one of, for example, when the storage control program 21 is initially started up and when the priority is changed. The time of the change of the priority is the time when in terms of at least one storage control program 21, the priority of at least one metadata portion accessed by the storage control program 21 is changed. For example, if may be at least one of when the start-up of the storage control program 21 is completed, when the standby storage control program 21S is upgraded to active, when the priority is changed buy a user, and the free area of the memory 102 is deficient. A metadata portion changed in priority will be taken here as an example (in the description of FIG. 6, "attentional metadata port ion"). The support program 203 determines whether the priority 506 of the attentional metadata portion is not greater than the priority threshold value indicative of the condition 1 data 451 (S601).

The fact that the determination result of S601 is true means that the priority is high as the attentional metadata portion is stored in the memory 102. In this case, the support program 203 determines whether the condition 1 application 522 of the attentional metadata portion matches the present storage format of the attentional metadata portion (whether the attentional metadata portion is already stored in the memory 102) (S602). The condition 1 reflection processing is ended when the determination result of S02 is true. When the determination result of S602 is false, the support program 203 Locks an area to be a storage destination of the attentional metadata portion of the memory 102 and stores the attentional metadata portion in the area (S04). For example, a function (e.g., mlock of Linux (Registered Trademark)) provided by an OS410 is utilized for this memory lock. Thus, even when the free capacity of the memory 102 is deficient, the attentional metadata portion stored in the area is controlled not to be stored (swapped out) in the storage device 103. The memory lock may be performed by the support program 203 itself in place of the use of the function provided by the OS410. After S604, the support program 203 updates the condition 1 application 522 corresponding to the attentional metadata portion from "non-application" to "application" (S606).

The fact that the determination result of S601 is false means that the priority is not high as the attentional metadata portion is stored in the memory 102. In this case, the support program 203 determines whether the condition 1 application 522 of the attentional metadata portion matches the present storage format of the attentional metadata portion (whether the attentional metadata portion is not stored in the memory 102) (S603). The condition 1 reflection processing is ended when the determination result of S603 is true. When the determination result of S603 is false, the support program 203 releases the lock of the area in which the attentional metadata portion is stored, of the memory 102 (S605). Consequently, the attentional metadata portion stored in the area becomes a swap-out or deletable state (in this stage, the attentional metadata portion may be deleted from the area or the area may be managed as a free area). The support program 203 updates the condition 1 application 522 corresponding to the attentional metadata portion from "application" to "non-application" (S606).

Figure 7:
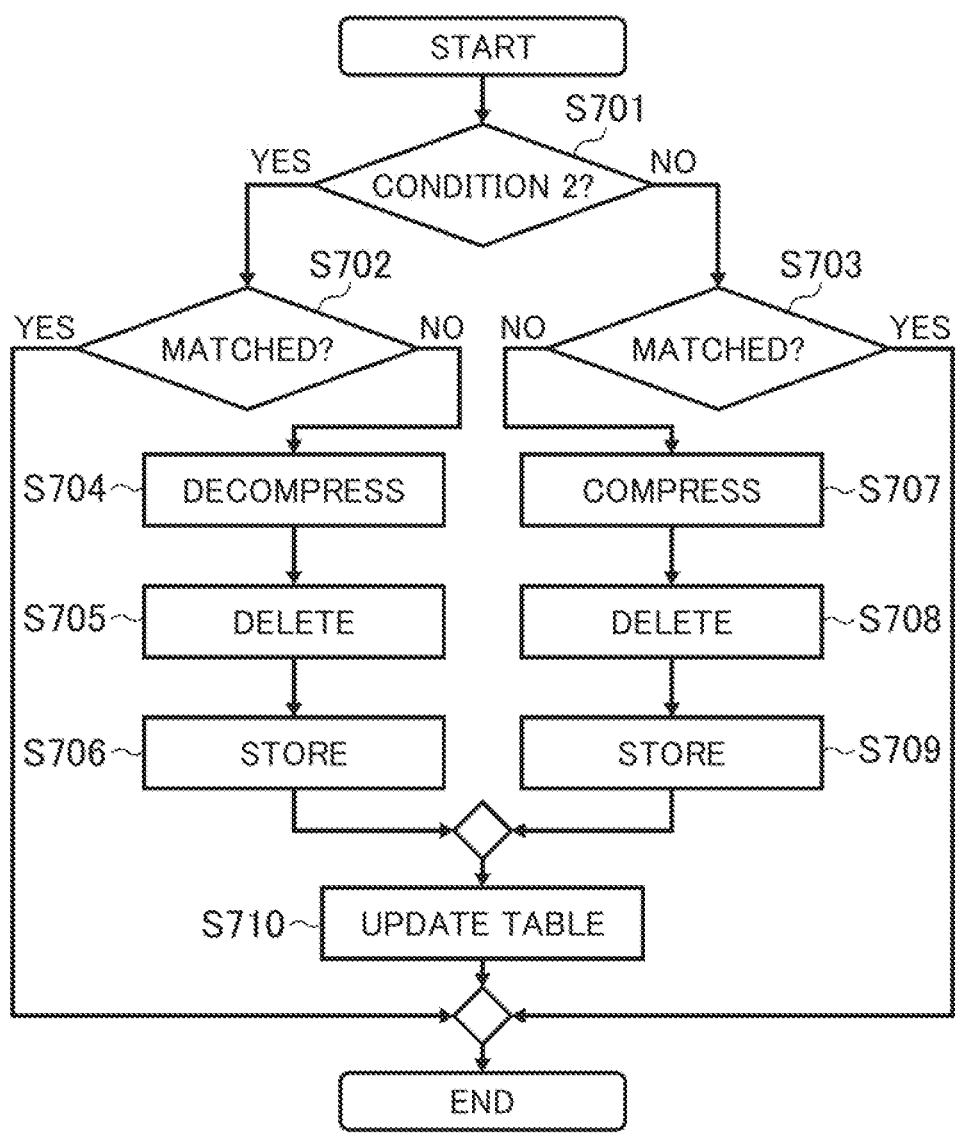
FIG. 7 shows an example of the flow of condition 2 reflection processing.

FIG. 7 shows an example of the flow of condition 2 reflection processing.

The condition 2 reflection processing is performed, for example, when the priority is changed. A metadata portion changed in priority will be taken here as an example (in the description of FIG. 7, "attentional metadata portion).

The support program 203 determines whether the priority 506 of the attentional metadata portion is not greater than the priority threshold value indicative of the condition 2 data 452 (S701).

The fact that the determination result of S701 is true means that the priority is high as the attentional metadata portion is uncompressed in the memory 102. In this case, the support program 203 determines whether the condition 2 application 523 of the attentional metadata portion snatches the present storage format of the attentional metadata portion (whether the attentional metadata portion is uncompressed in the memory 102) (S702). The condition 2 reflection processing is ended when the determination result of S702 is true. When the determination result of S702 is false, the support program 203 decompresses the compressed attentional metadata portion in the memory 102 (S704), deletes the compressed attentional metadata portion from the memory 102 (S705), and stores the uncompressed (decompressed) metadata portion in the memory 102 (S706). The support program 203 updates the condition 2 application 523 corresponding to the attentional metadata portion from "non-application" to "application" (S710).

The fact that, the determination result of S701 is false means that the priority is low as the attentional metadata portion is compressed in the memory 102. In this case, the support program 203 determines whether the condition 2 application 523 of the attentional metadata portion matches the present storage format of the attentional metadata portion (whether the attentional metadata portion is compressed in the memory 102) (S703). The condition 2 reflection processing is ended when the determination result of S703 is true. When the determination result of S703 is false, the support program 203 compresses the attentional metadata portion in the memory 102 (S707), deletes the pre-compression attentional metadata portion from, the memory 102 (S703), and stores the compressed metadata portion in the memory 102 (S709). The support program 203 updates the condition 2 application 523 corresponding to the attentional metadata portion from "application" to "non-application" (S710).

Figure 8:
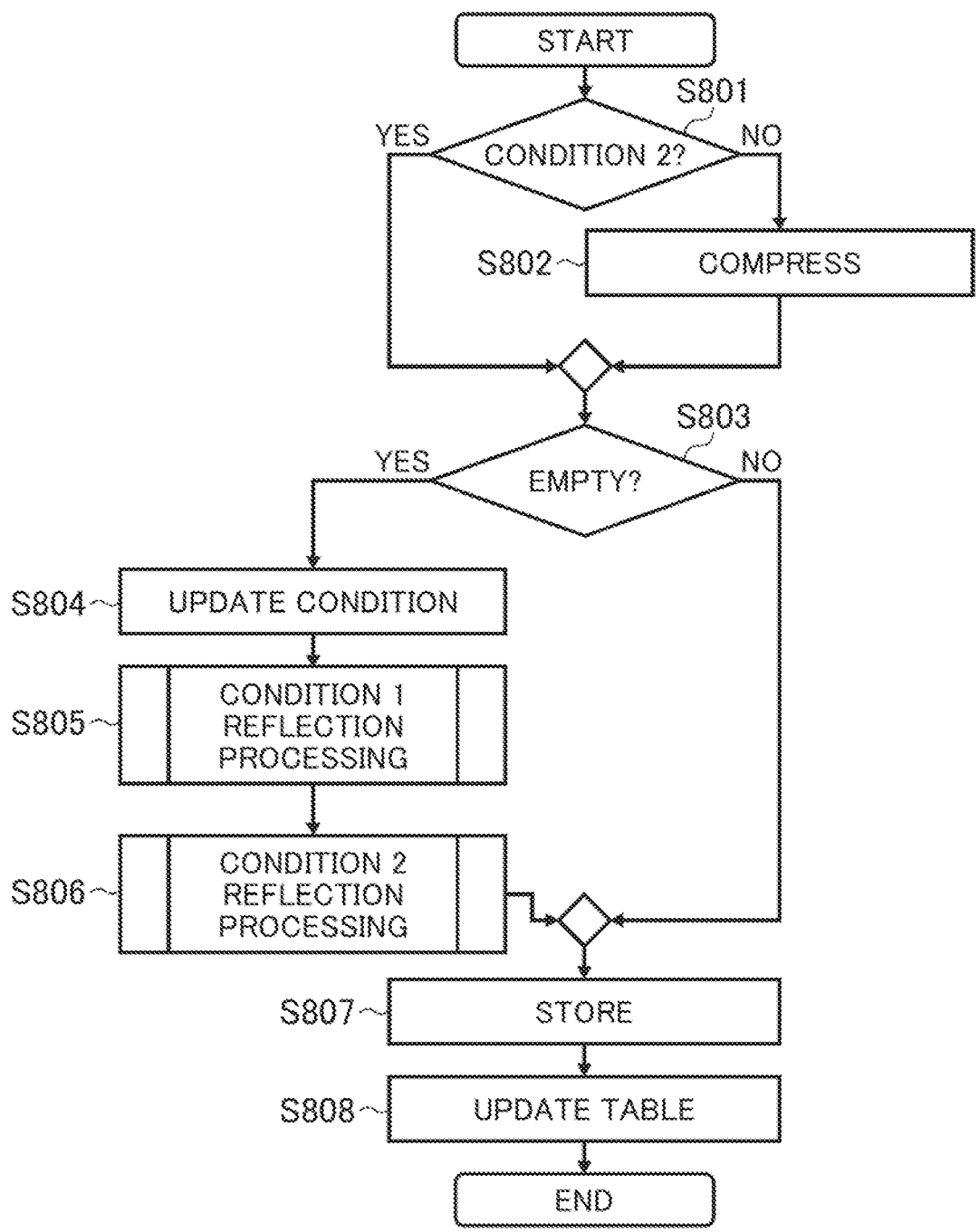
FIG. 8 shows an example of the flow of metadata write processing.

FIG. 8 shows an example of the flow of metadata write processing.

The metadata write processing is started, for example, when the support program 203 receives write instructions for the metadata portion from the storage control program 21. The support program 203 determines whether the priority 506 of the metadata portion to be written is not greater than the priority threshold value indicative of the condition 2 data 452 (S301). When the determination result of S801 is false, the support program 203 compresses the metadata portion to be written (S802).

When the determination result of S801 is true or after S802, the support program 203 determines from the capacity of the uncompressed or compressed metadata portion and the free capacity of the memory 102 whether a space insufficient or space excessive condition is met (S803). The fact that the space insufficient condition of the memory 102 is met is that, for example, the capacity of the uncompressed or compressed metadata portion may be above the free capacity of the memory 102. The fact that the space excessive condition of the memory 102 is met is that, for example, the rate of the free capacity to the capacity of the memory 102 may be a predetermined value or more.

When the determination result of S803 is true, the support program 203 updates at least one (condition 1 data 451 and/or condition 2 data 452) of the conditions 1 and 2 (S804). For example, in terms of at least one of the conditions 1 and 2, the support program 203 makes the priority threshold value smaller, i.e., raises at least one of the priority as the condition under which the memory storage is adopted and the priority as the condition under which the uncompression is adopted. As a result, subsequently, memory consumption is more reduced. Incidentally, in place of updating at least one of the conditions 1 and 2, the support program 203 may increase the value of the priority 506 of at least one type of metadata (lower the priority). That, is, the relative relation between at least one priority threshold value of the conditions 1 and 2, and the priority 506 of at least one type of metadata may be updated to the relation in which the memory consumption is more reduced.

After S804, the support program 203 performs condition 1 application processing (S805) shown in FIG. 6 and condition 2 application processing (S306) shown in FIG. 7. Either S605 or S806 may be executed first.

After S806 or when the determination result of S803 is false, the support program 202 stores the uncompressed or compressed metadata portion (the metadata portion to be written) in the memory 102 (S807). Then, the support program 203 adds a record corresponding to the metadata portion to the condition application table 454 (S808).

Figure 9:
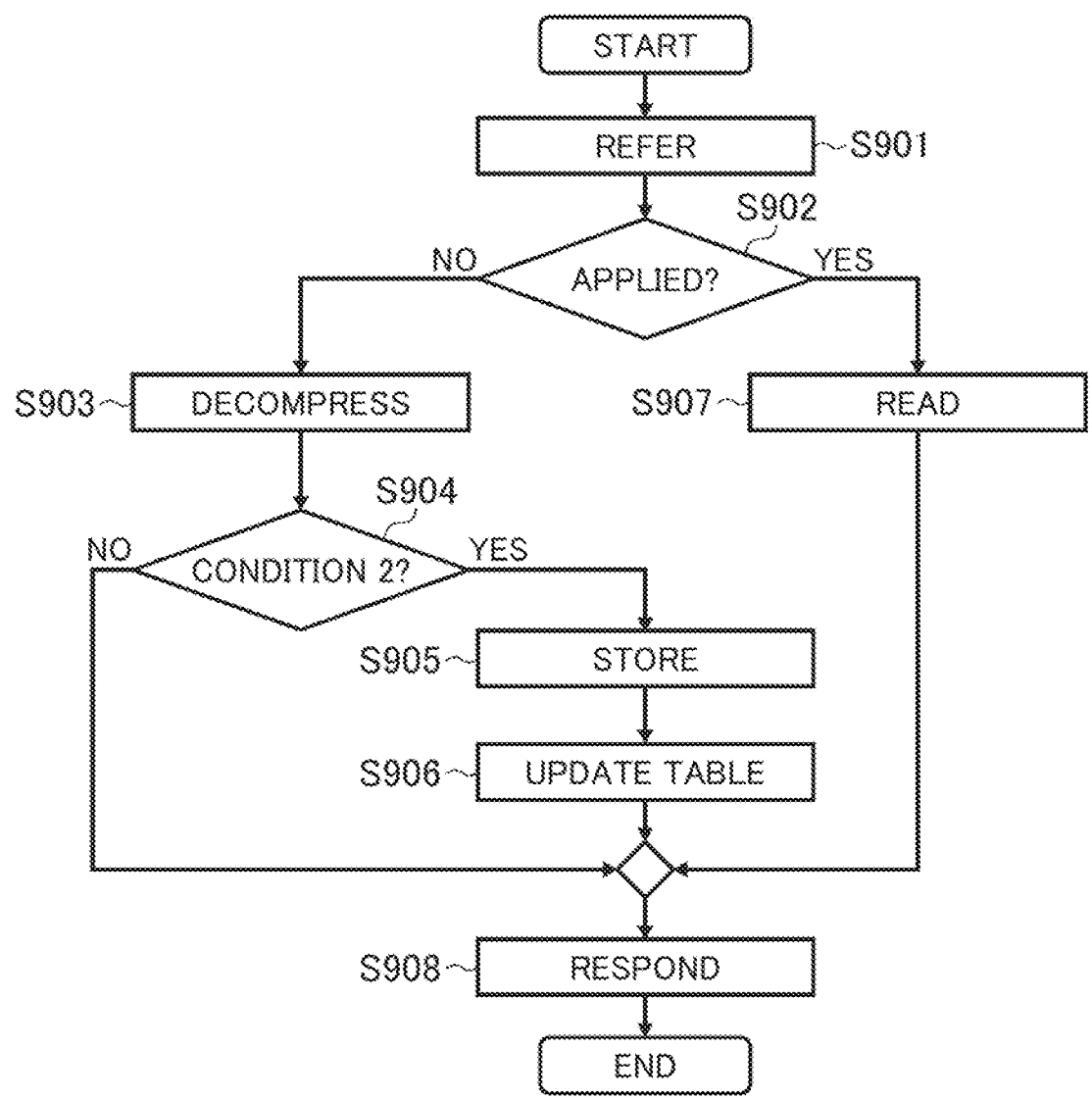
FIG. 9 shows an example of the flow of metadata read processing.

FIG. 9 shows an example of the flow of metadata read processing.

The metadata read processing is started, for example, when the support program 203 receives read instructions for the metadata portion from the storage control program 21. The support program 203 refers to the condition 2 application 523 corresponding to the metadata portion to be read (S901) and determines whether the condition 2 application 523 is "application" or not (S902).

When the determination result of S902 is true, the support program 203 reads the metadata portion to be read from the memory 102 and responds the read compressed metadata portion (S908).

When the determination result of S902 is false, the support program 203 reads the compressed metadata portion to be read from the memory 102 and decompresses the read compressed metadata portion (S903). The support program 203 determines whether the priority 506 corresponding to the metadata portion is not greater than the priority threshold value as the condition 2 (S904).

When the determination result of S904 is false, the support program 203 responds the metadata portion decompressed in S903 (S908).

Meanwhile, when the determination result of S904 is true, the support program 203 stores the metadata portion decompressed in S903 in the memory 102 (manages the area in which the corresponding compressed metadata portion is stored, as a free area) (S905), and updates the condition 2 application 523 corresponding to the metadata portion from "non-application" to "application" (S906). The support program 203 responds the metadata portion decompressed in S903 (S908).

Upon the above-described priority change, both of the condition 1 reflection processing and the condition 2 reflection processing may be executed, but it is possible that the support program 203 receives the read instructions for the metadata portion before the execution of those processing. In this case, as shown in FIG. 9, in the metadata read processing, the metadata portion to be read is stored on so-called demand in a storage method appropriate to the post-change priority.

Figure 10:
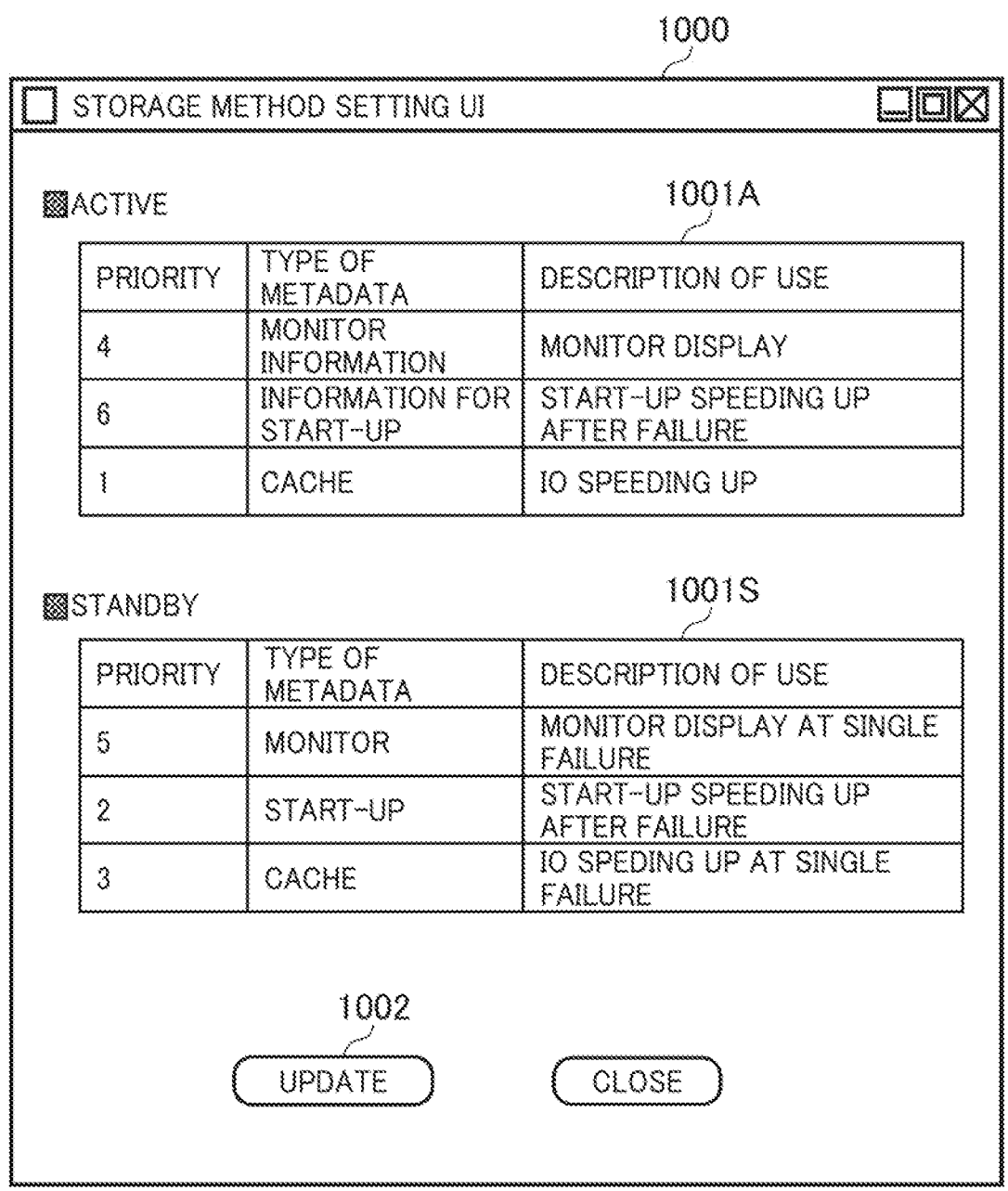
FIG. 10 shows an example of a storage method setting UX.

FIG. 10 shows an example of a storage method setting UI.

The storage method setting UI1000 may be a UI (User Interface) for setting a storage method for each metadata type. The storage method setting UI1000 is, for example, a GUI. The storage method setting UI1000 is provided to an unillustrated management node (e.g., a management computer connected to the front-end network 120) by the support, program 203.

The setting of the storage method is, for example, a priority setting for each metadata type. Information displayed on the storage method setting UI1000 is based on the storage destination control table 453. Specifically, for example, the storage method setting UI1000 has a UI portion 1001A which receives the priority for various metadata for active, and a UI portion 1001S which receives the priority for various metadata for standby. Even in both of the UI portions 1001A and 1001S, the column of the priority is a column in which a manager (e.g., an example of a user) is capable of inputting the priority.

When an update button 1002 in the storage method setting UI1000 is pressed, the priority input to each of the UI portions 1001A and 1001S is registered in the storage destination control table 453.

In the example shown in FIG. 10, in terms or each redundantization group, the priority for each metadata type for active is common, and the priority for each metadata type for standby may also be common. Further, in terms of each redundantization group, the priority for each metadata type for standby may be common to all the standby storage control programs 21S.

At least one of the following may be adopted for the storage method setting UI:
 the priority for each metadata type for active and the priority for each metadata type for standby can be set for each redundantization group,
 in terms of at least one redundantization group, the priority of various metadata for the standby storage control program 21S decided as the failover destination, and the priority of various metadata for each standby storage control program 21S other than it can be set differently,
 at least one of the priority threshold value as the condition 1 and the priority threshold value as the condition 2 can be set, and
 in place of the setting of priority, it is possible to specify for each metadata type whether the memory storage is adopted and whether compression is adopted.

Figure 11:
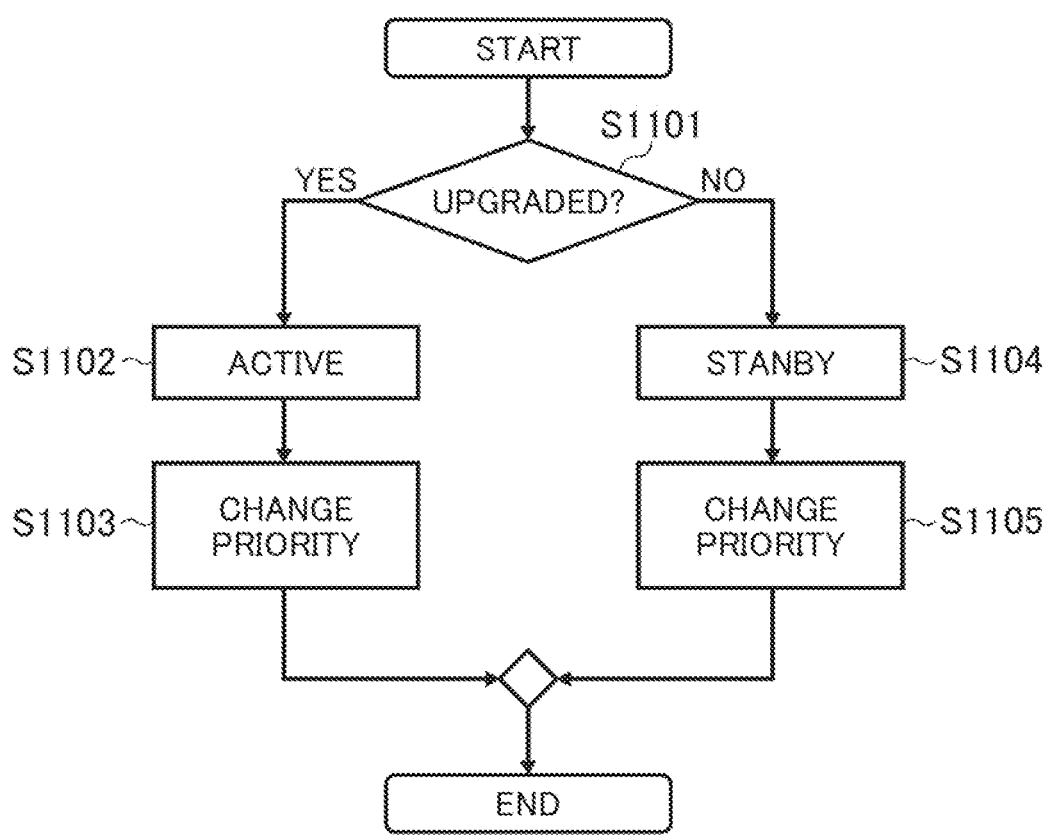
FIG. 11 shows an example of the flow of state change processing.

FIG. 11 shows an example of the flow of state change processing.

The state change processing is an example of processing in which the priority of various metadata for the storage control program 21 is changed. The state change processing is started in response to either of the following, for example:
 state upgrading associated with the occurrence of a failure in the storage node 100. That is, when a failure occurs in a certain storage node 100, the state of any standby storage control program 21S belonging to the same redundantization group as the active storage control program 21A in the storage node 100 is upgraded to "active", and
 state downgrading with the recovery of the storage node in which the failure occurs. That is, when the active storage control program becomes operable in another storage node 100 due to the addition of the storage node 100, etc. as countermeasures to the failure, the storage control program (active) in the other storage node 100 itself and the standby storage control program constituting the redundantization group are operated, the state of its own storage control program is downgraded from "active" to "standby", and thereafter, the state of the operated standby storage control program is upgraded from "standby" to "active". Consequently, it is possible to avoid a situation in which a plurality of active storage control programs exist in one storage node 100.

The support program 203 determines whether the state change of the storage control program 21 is upgrading to "active" (S1101).

The fact that the determination result of S1101 is true means the upgrading of the state change to "active". In this case, the support program 203 changes the state 502 corresponding to the storage control, program 21 upgraded in state to "active" (S1102), and changes the priority 506 of various metadata corresponding to the storage control program 23 to the priority of various metadata for active (S1103).

The fact that the determination result of S1101 is false means downgrading of the state change to "standby". In this case, the support program 203 changes the state 502 corresponding to the storage control program 21 downgraded in state to "standby" (S1104), and changes the priority 506 of various metadata corresponding to the storage control program 21 to the priority of various metadata for standby (S1105).

According to the description referring to FIGS. 6 through 11 shown above, for example, the following can be said.

As regarding each redundantization group, as a storage method of metadata, there are a plurality of storage methods which comply with at least one of whether memory storage is adopted and whether compression is adopted. Thus, a storage method of a metadata portion can be decided depending on whether a reduction of an increase in I/O latency is prioritized or a reduction in memory consumption is prioritized. A target metadata portion (a portion including a metadata portion in the case where the state of the standby storage control program 21S is upgraded to "active" and which can be accessed by the storage control program after a failover) is stored in accordance with the storage method in which the memory storage and the compression are adopted.

Also, as regarding each redundantization group, for each metadata type, the priority of the corresponding type of metadata differs depending on whether a storage control program accessing the corresponding type of metadata is active or standby. The priority for the metadata type corresponding to a metadata portion accessed after a failover by the standby storage control program 21S is the priority corresponding to the storage method in which the memory storage and the compression are adopted (specifically, for example, it corresponds to the priority being the value which is not greater than the priority threshold value as the condition 1 but is larger than the priority threshold value as the condition 2). As to each redundantization group, for each storage control program belonging to the redundantization group, the support program 203 in the storage node with the storage control program arranged therein decides, for each metadata type, a storage method of the corresponding type of metadata in accordance with the priority corresponding to the metadata type and the state (being active or standby) of the storage control program, and stores the corresponding type of metadata in accordance with the decided storage method. Consequently, various metadata are stored in the storage method optimal for the combination of the metadata type and the state of the storage control program 21.

Further, as regarding each redundantization group, when any type of metadata is to be accessed by any storage control program 21 belonging to the redundantization group, the support program 203 in the storage node 100 with the storage control program 21 arranged therein determines whether the storage method of the corresponding type of metadata is a storage method appropriate for the priority corresponding to the metadata type and the state (being active or standby) of the storage control program 21. When the determination result is false, the support program 203 stores the corresponding type of metadata in accordance with the appropriate storage method. The state of the storage control program is changed as appropriate but even if the state of the storage control program is changed, storage according to the storage method appropriate for various data can be maintained. For example, as in S904 of FIG. 9, when the storage method of the metadata portion to be read is inappropriate in relation to the state of the storage control program 21 with the metadata portion to be read, the metadata portion to be read is stored in the storage node 100 in an appropriate storage method.

Although one embodiment has been described above, it is an example for describing the present invention, and is not intended to limit the scope of the present invention only to the embodiment. The present invention can be implemented even in other various forms. For example, at least part of the processing executed by the support program 203 may be executed by the storage control program 21 in place of the support program 203.

What is claimed is:

1. A storage system comprising:
    a plurality of storage nodes each having a memory, a storage device, and a processor connected to the memory and the storage device,
    wherein one or a plurality of redundantization groups respectively comprising two or more storage control programs are arranged in the storage nodes,
    wherein as regarding each of the one or plurality of redundantization groups,
    the two or more storage control programs constituting the corresponding redundantization group and respectively executed by the processors to perform storage control are arranged in two or more different storage nodes,
    the two or more storage nodes maintain redundantization at the two or more storage nodes, of metadata accessed in the storage control, and
    any storage control program is active and each of the remaining one or two or more storage control programs is standby,
    wherein as regarding each active storage control program, the processor of the storage node provided with the active storage control program stores in the memory of the storage node by uncompression, an active metadata portion being a portion used in at least the active storage control program, the portion being in metadata existing in the storage node as regarding the corresponding redundantization group, and performs I/O by using an uncompressed active metadata portion being in the memory, and
    when a failure occurs in the storage node provided with the active storage control program, a failover in the corresponding redundantization group from the active storage control program to any standby storage control program is performed, and
    wherein as regarding at least one standby storage control program, the processor of the storage node provided with the standby storage control program compresses a target metadata portion including a metadata portion capable of being accessed after the failover, the portion being in metadata existing in the storage node as regarding the corresponding redundantization group, and stores the same in the memory of the storage node;
    wherein as regarding at least one redundantization group, the at least one standby storage control program is the standby storage control programs decided as a failover destination, of the two or more standby storage control programs;
    wherein as regarding the at least one redundantization group, for each of standby storage control programs other than the standby storage control program decided as the failover destination, of the two or more standby storage control programs, the processor of the storage node with the standby storage control programs arranged therein stores at least part of metadata existing in the storage node as regarding the corresponding redundantization group in the storage device without storing the same in the memory.

2. The storage system according to claim 1, wherein as regarding each redundantization group, the target metadata portion includes a portion excluding the following (X) and (Y) of the metadata:
    (X) a portion accessed for processing in which the standby storage control program becomes active due to the failover and is started up, and
    (Y) a portion accessed for I/O which is performed when the standby storage control program is started up due to the failover.

3. The storage system according to claim 1, wherein as regarding each redundantization group, in terms of an active storage control program, the processor of the storage node provided with the active storage control program compresses a portion at which the frequency of access is less than a threshold value, the portion being in metadata existing in the storage node as regarding the corresponding redundantization group, and stores the same in the memory of the storage node.

4. The storage according to claim 3, wherein as regarding the corresponding redundantization group, in terms of an active storage control program, the processor of the storage node provided with the active storage control program compresses a portion unnecessary for I/O which complies with an I/O request even if the frequency of access is more than or equal to the threshold value, the portion being in metadata existing in the storage node as regarding the corresponding redundantization group, and stores the same in the memory of the storage node.

5. The storage system according to claim 1, wherein as regarding each redundantization group, when a standby storage control program is started up due to being taken as a failover destination and becomes as active storage control program, the processor of the storage node provided with the active storage control program compresses a metadata portion necessary for start-up processing of the active storage control program, the metadata portion being in metadata existing in the storage node as regarding the corresponding redundantization group, and stores the same in the memory of the storage node.

6. The storage system according to claim 1, wherein as regarding each redundantization group, there are as a storage method of metadata, a plurality of storage methods each complying with at least one of whether memory storage is adopted and whether compression is adopted,
    wherein as regarding whether the memory storage is adopted, storage of the storage device is adopted when the memory storage is unadopted, and wherein the storage method of the target metadata portion is a storage method in which the memory storage and the compression are adopted.

7. The storage system according to claim 6, wherein as regarding the corresponding redundantization group, in terms of each of a plurality of types of metadata constituting the metadata, the priority of the corresponding types of metadata differs depending on whether a storage control program accessing the corresponding types of metadata is active or standby,
  wherein as regrading the standby storage control program, the priority for a metadata type corresponding to a metadata portion capable of being accessed after the failover is the priority corresponding to the storage method in which the memory storage and the compression are adopted,
  wherein as regarding each storage control program belonging to the corresponding redundantization group, the processor of the storage node provided with each storage control program decides for each metadata type, a storage method of the corresponding type of metadata in accordance with the priority corresponding to the metadata type and whether the storage control program is active or standby, and stores the corresponding type of metadata in accordance with the decided storage method.

8. The storage system according to claim 7, wherein as regarding the corresponding redundantization group, when any type of metadata is to be accessed by any storage control program belonging to the corresponding redundantization group, the processor of the storage node provided with the storage control program determines whether the storage method of the corresponding type of metadata is a storage method appropriate for the priority corresponding to the metadata type and whether the storage control program is active or standby, and
  wherein when the determination result is false, the processor of the storage node stores the corresponding type of metadata in accordance with the appropriate storage method.

9. The storage system according to claim 8, wherein as regarding the corresponding redundantization group, in terms of each of the two or more storage control programs, the processor of the storage node having the storage control programs performs the following when a space capacity of the memory of the storage node meets a space insufficient or space excessive condition even if the processor compresses the corresponding type of metadata in accordance with eh appropriate storage method:
  relatively changing a relation between the priority corresponding to whether the storage control program is active or standby and a metadata type and the priority corresponding to an appropriate storage method to a relation in which memory consumption is more reduced, and
  changing a storage method of at least one type of metadata in accordance with the relation after the change.

10. A storage control method of a storage system comprising a plurality of storage nodes provided with one or a plurality of redundantization groups respectively constituted of two or more storage control programs, comprising the steps of:
  as regarding each of the one or plurality of redundantization groups, causing two or more different storage nodes provided with the two or more storage control programs constituting the corresponding redundantization group and performing storage control to maintain redundantization on the two or more storage nodes of metadata accessed in the storage control;
  as regarding each of the one or plurality of redundantization groups, holding any storage control programs active and holding each of the remaining one or two or more storage control programs on standby;
  as regarding each active storage control program, causing a processor of the storage node provided with the active storage control program to store in a memory of the storage node by uncompression, an active metadata portion being a portion used in at least the active storage control program, the portion being in metadata existing in the storage node as regarding the corresponding redundantization group, and to preform I/O by using an uncompressed active metadata portion being in the memory;
  when a failure occurs in the storage node provided with the active storage control program, performing a failover in the corresponding redundantization group from the active storage control program to any standby storage control program; and
  as regarding at least one standby storage control program, causing the storage node provided with the standby storage control program to compress a target metadata portion including a metadata portion capable of being accessed after the failover, the portion being in metadata existing in the storage node as regarding the corresponding redundantization group and to store the same in a memory of the storage nodes
  wherein as regarding at least one redundantization group, the at least one standby storage control program is the standby storage control programs decided as a failover destination, of the two or more standby storage control programs;
  wherein as regarding the at least one redundantization group, for each of standby storage control programs other than the standby storage control program decided as the failover destination, of the two or more standby storage control programs, a processor of the storage node with the standby storage control programs arranged therein stores at least part of metadata existing in the storage node as regarding the corresponding redundantization group in a storage device without storing the same in a memory.

* * * * *